United States Patent [19]
Bosnar et al.

[11] Patent Number: 5,796,253
[45] Date of Patent: Aug. 18, 1998

[54] TIME-DOMAIN ELECTROMAGNETIC GEOPHYSICAL MAPPING INSTRUMENTS

[76] Inventors: Miro Bosnar, 242 Burbank Drive, North York, ON, Canada, M2K 1P8; J. Duncan McNeill, P.O. Box 629, Chester, Nova Scotia, Canada

[21] Appl. No.: 657,454

[22] Filed: May 29, 1996

[51] Int. Cl.$^6$ .............................. G01V 3/10; G01V 3/165; G01V 3/16
[52] U.S. Cl. ........................... 324/336; 324/239; 324/330
[58] Field of Search ........................... 324/67, 239, 326, 324/329, 330, 334, 336

[56] References Cited

U.S. PATENT DOCUMENTS

| | | |
|---|---|---|
| 3,317,744 | 5/1967 | Geleynse .............................. 324/336 X |
| 3,991,363 | 11/1976 | Lathrop .............................. 324/529 |
| 4,775,832 | 10/1988 | Pecukonis .............................. 324/67 |
| 4,896,117 | 1/1990 | Floweredew et al. ............... 324/529 X |
| 5,467,011 | 11/1995 | Hunt .............................. 324/67 |
| 5,498,958 | 3/1996 | Tu et al. .............................. 324/336 X |

Primary Examiner—Gerard R. Strecker
Attorney, Agent, or Firm—Ridout & Maybee

[57] ABSTRACT

In a time domain electromagnetic mapping technique of the type using transmitter pulses of half-sinusoidal waveform, with the half sinusoids being segments of a sinusoidal waveform having a frequency and corresponding to a resonant frequency of the transmitter coil, an improved current fall time at the end of each pulse is obtained by forming each transmitter pulse of plural immediately successive half sinusoids, the transmitter coil being tuned to an appropriately increased resonant frequency relative to the pulse repetition rate. Circuits for generating the improved pulse waveforms are disclosed.

4 Claims, 8 Drawing Sheets

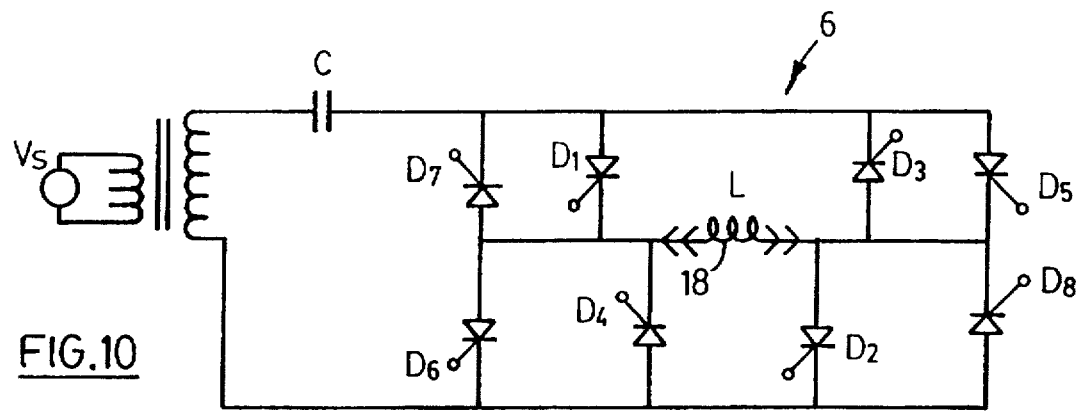
FIG.10
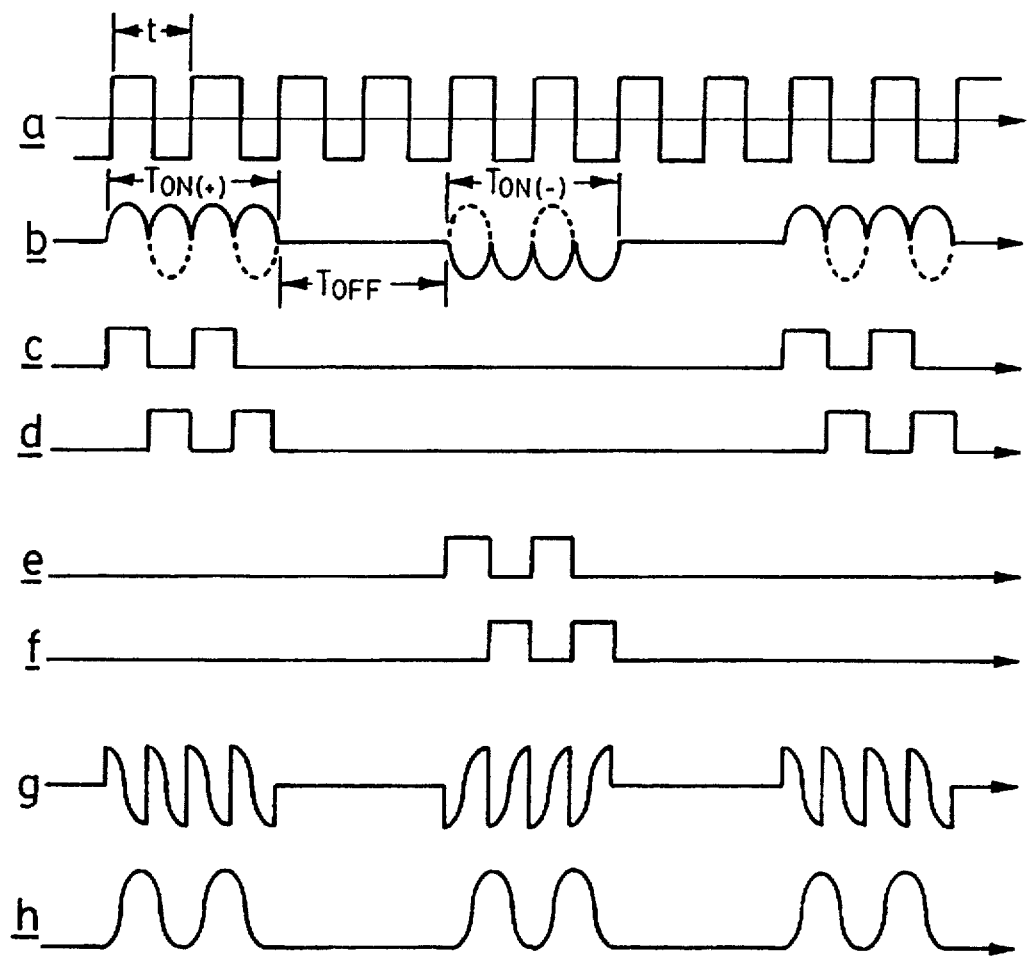

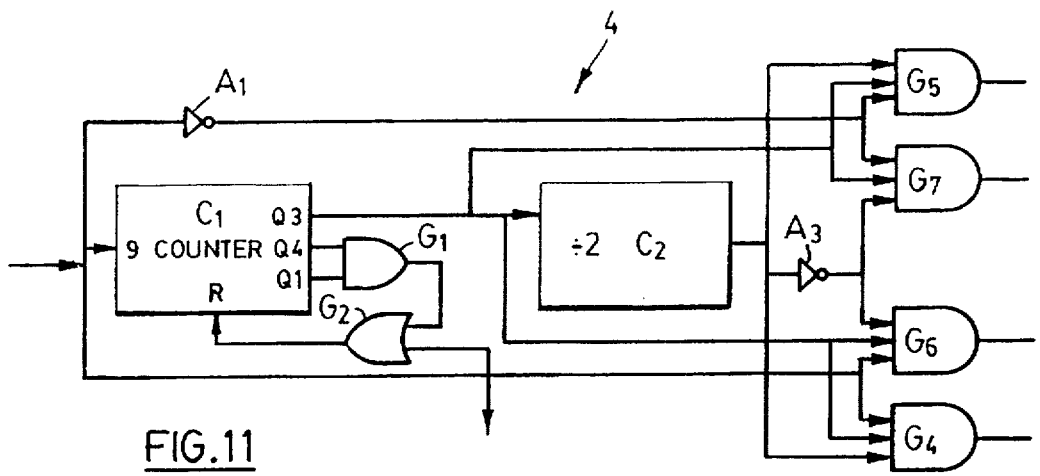
FIG.11
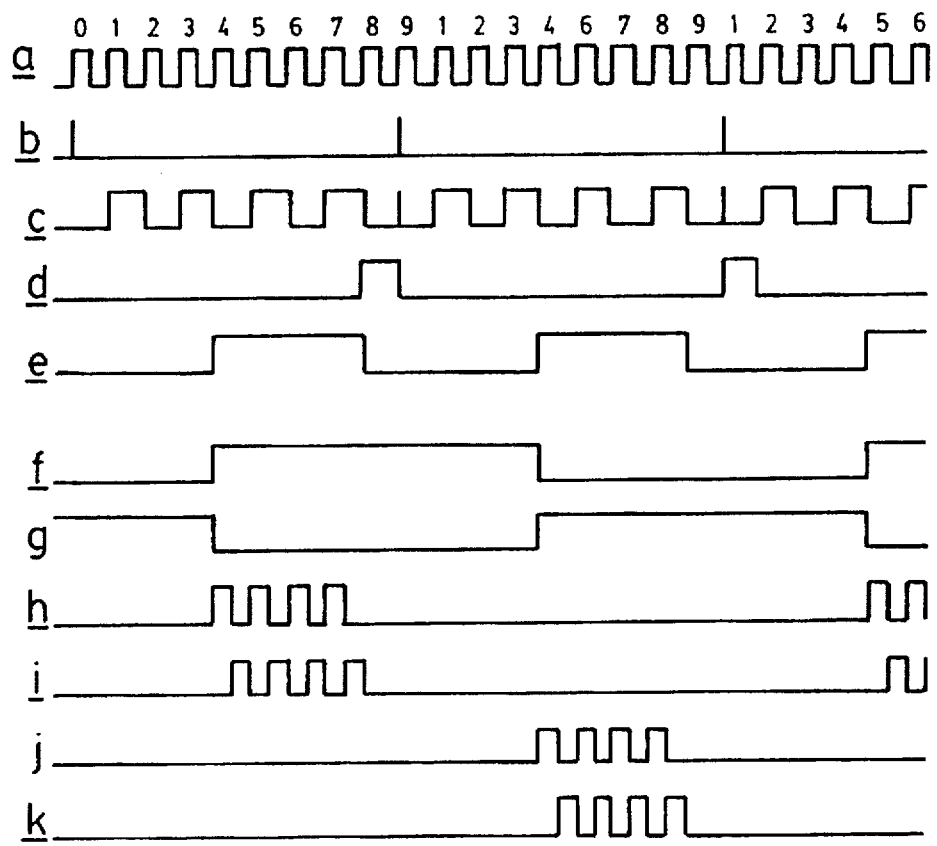

TIME-DOMAIN ELECTROMAGNETIC GEOPHYSICAL MAPPING INSTRUMENTS

BACKGROUND OF THE INVENTION

1. Field of the Invention

This invention relates to time-domain electromagnetic geophysical mapping instruments.

2. Review of the Art

Techniques for the application of time-domain electromagnetic (TDEM) instruments to both general geological mapping and the direct detection of conductive ore-bodies have been well established for many years, but to facilitate proper understanding of the present invention, aspects of these techniques will be reviewed with reference to the diagrams forming FIGS. 1–7 of the accompanying drawings.

A transmitter loop or coil TL is laid either on or (in the case of an airborne system) transported above the earth in an aircraft AC and a receiver loop or coil RL is located in proximity to the transmitter coil or towed behind the aircraft in a bird B as shown in FIG. 1A.

In general, the most desirable waveform for the current flowing in the transmitter loop or coil is the periodic waveform shown in FIG. 2a. At the beginning of a period, the current rises more or less abruptly from a value of zero to a constant value $I_o$, which is maintained for one quarter period, at which time the current is rapidly reduced back to zero. The current remains at zero for the next quarter period, after which it changes more or less abruptly to $-I_o$ (i.e., it flows in the opposite direction in the coil or loop) for the next quarter period, after which the whole cycle is repeated again.

When the positive or negative current $I_o$ is flowing, it generates a primary magnetic field in the vicinity of transmitter loop or coil, which is directly proportional to the magnitude $I_o$ of the current, and which couples with the earth or nearby subsurface conductive ore bodies. When the current, and thus the primary magnetic field, changes abruptly from zero to plus or minus $I_o$, or back to zero again, Faraday's Law dictates that the time-varying primary magnetic field will induce a pulse emf waveform as shown in FIG. 2b in the earth and/or in subsurface conductors. This electromotive force will cause eddy currents to flow in the earth or sub-surface conductors, which, since either the earth or conductive ore bodies must have finite electrical resistivity, will immediately commence to decay with time, as is shown by the waveform of FIG. 2c.

In the same way that the current in the transmitter coil or loop caused a primary magnetic field to be generated, which was directly proportional to the magnitude of the current, the decaying eddy currents in the ground or conductive ore bodies will cause a decaying secondary magnetic field, which is proportional to the magnitude of these currents at any given time. The amplitude and time-decay characteristics of this secondary magnetic field (more accurately, its time derivative) can be measured by a receiver attached to the receiver coil, and these characteristics can be used to determine the electrical properties of the earth or conductive ore bodies.

It will be observed in the waveforms shown in FIGS. 2a, 2b and 2c that, of the decaying eddy current pulses, one half flow at the same time as current flows in the transmitter loop or coil, and thus measurement of the secondary magnetic fields that they represent will be difficult since they occur at the same time as the much larger primary magnetic fields arising directly from the transmitter. Conversely, the other half of the decaying eddy current pulses flow while the transmitter current is shut off, and the secondary magnetic fields that they represent can therefore be measured in the absence of the primary magnetic field, greatly simplifying measurement of the small secondary magnetic field. It is this characteristic that makes the time-domain electromagnetic technique so useful for mapping the electrical properties of the earth or conductive ore bodies.

In order to enjoy the advantages of the time-domain electromagnetic technique, measurement is made of the secondary magnetic field produced by those currents which flow in the absence of the transmitter current and thus in the absence of the primary magnetic field. It is clear from FIG. 2, that the pulses of emf that cause these special currents to flow are in turn caused by the act of the transmitter current turning off (the other, uninteresting currents are caused by the transmitter turning on). This focuses attention on transmitter current turn-off characteristics since it is this portion of the transmitter current waveform that generates the eddy currents of interest.

As stated above, the time-domain electromagnetic technique is used both for geological mapping and the direct detection of conductive ore-bodies. For the remainder of this discussion it will be assumed that the objective is to detect and measure the electrical properties of a conductive object. To further simplify the discussion it will be assumed that the conductive object is a circular loop of wire LP (see FIG. 3), placed in the vicinity of both the transmitter coil 18 and the receiver coils 16. This simple model is often used to determine the detection characteristics of TDEM systems since the response from it contains the essential characteristics of the response from much more complicated systems of conductors. Thus although the discussion is limited to the response from a simple loop, the consequences of the discussion apply to all manner of conductive targets, including the earth itself.

It is well known that the important electrical characteristics of such a loop are its inductance, L, and resistance, R. If the current in the transmitter coil, and thus the primary magnetic field, decays infinitely quickly at the end of an 'on' period as shown in the waveform of FIG. 4a, the electromotive force (emf) induced in the loop target, given in accordance with Faraday's Law, by $$emf = dF/dt$$

where F is the magnetic flux intercepted by the target loop, will take the form of an infinitely quick pulse, otherwise known as an impulse, as shown in the waveform of FIG. 4b. The current that flows in the loop, caused by this particular emf, will be given as $$i(t) = (F/L) \times \exp(-t/T)$$

where T, the characteristic "time-constant" of the loop is given by $$T = L/R$$

Such an idealized current flow is illustrated in the waveform of FIG. 4c. Since the primary field is turned off instantaneously, causing an impulse emf, this particular response is known as the impulse response of the loop.

If instead of turning off instantaneously (i.e. in zero time), the transmitter loop current takes the form of a linear ramp, the response is as shown in FIGS. 5a, 5b and 5c. The current decreases linearly with time, as shown in FIG. 5a over a time range given by To. Applying Faraday's Law to this case shows that the emf induced in the target will now have a rectangular shape also as shown in FIG. 5b. The amplitude of this pulse F/To is less than that shown in FIG. 4b, but the time duration is longer, extending over the time To. The area under the emf curve can be shown to be the same for both FIG. 4b (which is of very short time duration but has a high amplitude) and FIG. 5b (which has a smaller amplitude but extends further in time).

The time response of the loop current (FIG. 5c) arising from the transmitter current waveform of FIG. 5a is given (during the time that the current is decaying, i.e after t=To) by $$i(t)=((T/To)\times(1-\exp(-To/T)))\times(F/L)\times\exp(-t/T)=A\times(F/L)\times\exp(-t/T)$$

In this expression the zero position on the time axis has been shifted to the end of To.

This expression is essentially the same as that for the impulse response, except that the initial amplitude of the exponential decay is modified by the term in brackets, given as A. Furthermore, A is a function only of the ratio To/T, i.e. of the duration of the ramp turn-off divided by the time-constant of the loop.

A plot of A (which is the relative response of the initial amplitude) as a function of To/T shows that, as long as the ratio To/T is small, i.e. that the duration of the ramp is short compared with the loop time-constant, the initial amplitude of the decay is virtually unaffected. But once this ratio starts to increase beyond a value of about unity, the initial amplitude starts to decay, and as the ratio increases beyond unity, the initial amplitude starts to decrease as 1/To. A smaller initial amplitude, which means of course that the amplitude of the entire signal is also smaller, makes a target more difficult to detect, and it is therefore important to keep the duration of To as short as possible, particularly if it is desired to detect those targets having short time-constants. Ideally the turn-off time would be zero, but transmitter loops or coils have a finite (and usually large) inductance, which prevents the current from being reduced to zero in very short times. Nevertheless, in the design of a TDEM transmitter, great effort is always expended in reducing the duration of the ramp to the smallest possible value.

In the design of a TDEM system the designer is always faced with the detection of small signals in large amounts of environmental noise. A natural solution is to increase the transmitter coil or loop dipole moment (defined as the product of the number of turns of the loop multiplied by the area of the loop multiplied by the current in the loop). If there is a constraint on the maximum area of the loop, as there usually is, the only alternative is to increase the number of turns and/or the loop current. Unfortunately the inductance of the transmitter loop increases with the square of the number of turns. Furthermore, assuming that the transmitter is designed (as it often is) so that the output terminal voltage is constrained to be constant during the actual current turn-off time, it can be shown that To is given by $$To=L\times I_o/E$$

where E is the terminal voltage. Thus increasing either the number of turns or the loop current will increase To, which is undesirable.

Canadian Patent No.781,000 (Geleynse), commercialized as the Barringer INPUT (trademark) airborne TDEM system, sought to solve the problem of maximizing the transmitter dipole by using a semi-resonant transmitter for driving the loop. The resultant transmitter current waveform, shown in FIG. 6 consists of an alternating series of sinusoids of duration To. Use of the principles of resonance allowed the designer to achieve a large current in the multi-turn transmitter loop. As will be obvious however from examination of FIG. 6, viewed in the light of the arguments presented above, the long effective turn-off characteristics of this waveform will provide poor performance in detecting short time-constant targets. In modern TDEM systems it is usually desired to detect targets having a full range of time-constants, thus requiring a short transmitter turn-off time. At the same time the maximum possible dipole moment is also always desirable.

SUMMARY OF THE INVENTION

We have devised a solution to this problem, which combines the advantages of the technique used in the Geleynse patent with the ability to provide much faster turn off times. We achieve this by utilizing a transmitter current waveform which, like that disclosed by Geleynse, is formed by a series of half-sinusoids, but by contrast with Geleynse, each quarter-period during which current is applied to the coil is composed not of a single half sinusoid, but plural immediately successive half sinusoids of the same polarity. With such a waveform, the transmitter turn-off time is essentially still determined by the slope of the final portion of the final half sinusoid, but for a given period of the transmitter current waveform, the slope will be relatively steeper by a factor corresponding to the number of half sinusoids making up each quarter period during which the current flows. In fact, the revised waveform permits any desired degree of approximation to an ideal square waveform by increasing the number of sinusoids, while still permitting resonant operation of the transmitter coil. We have also developed transmitter circuits to implement the improved transmitter current waveform.

Further features of the invention will become apparent from the following description of presently preferred embodiments with reference to FIGS. 7–11k of the accompanying drawings.

SHORT DESCRIPTION OF THE DRAWINGS

Figure 5:
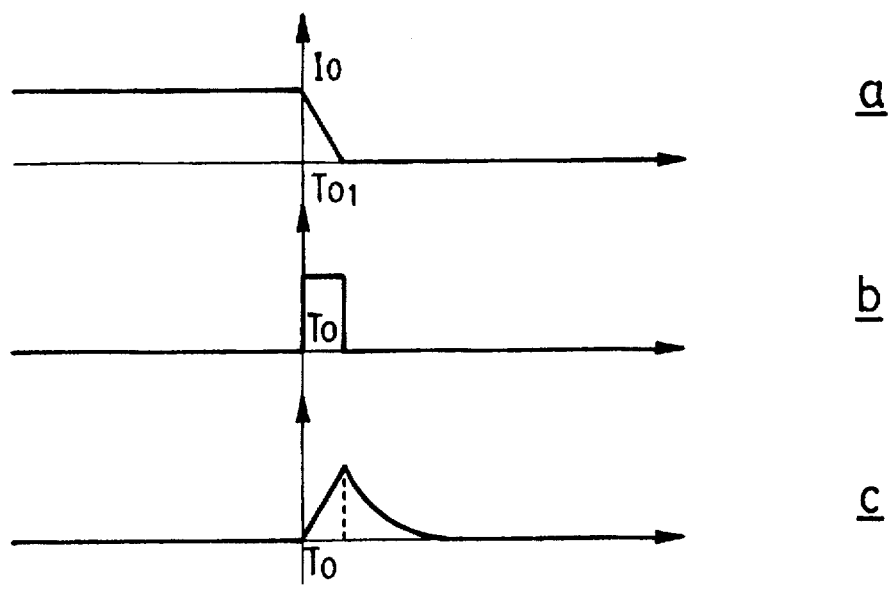
Figure 6:
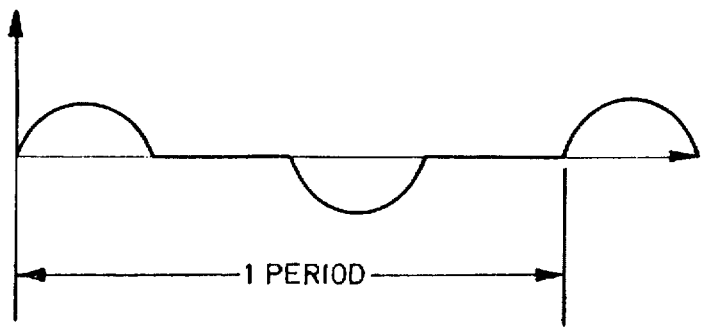
Figure 7:
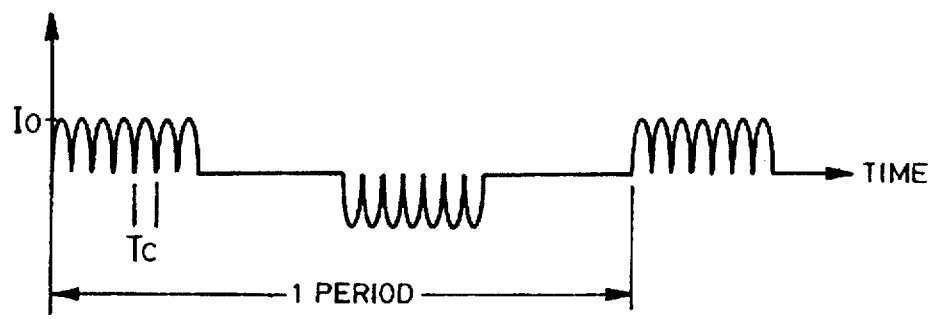
Figure 8:
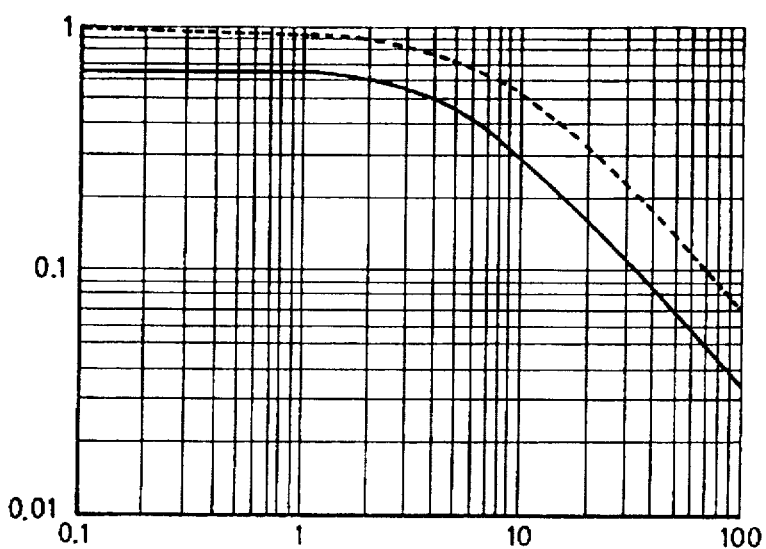
Figure 9:
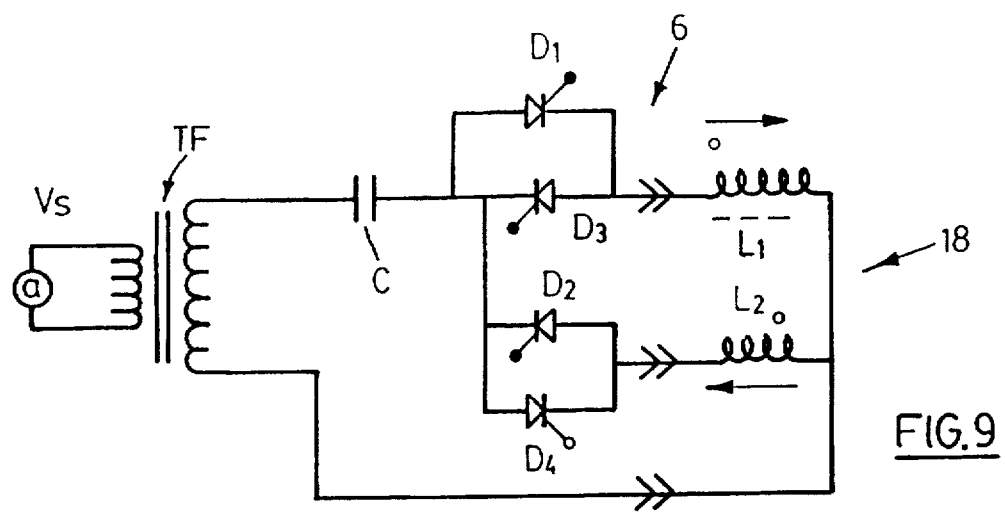
Figure 9:
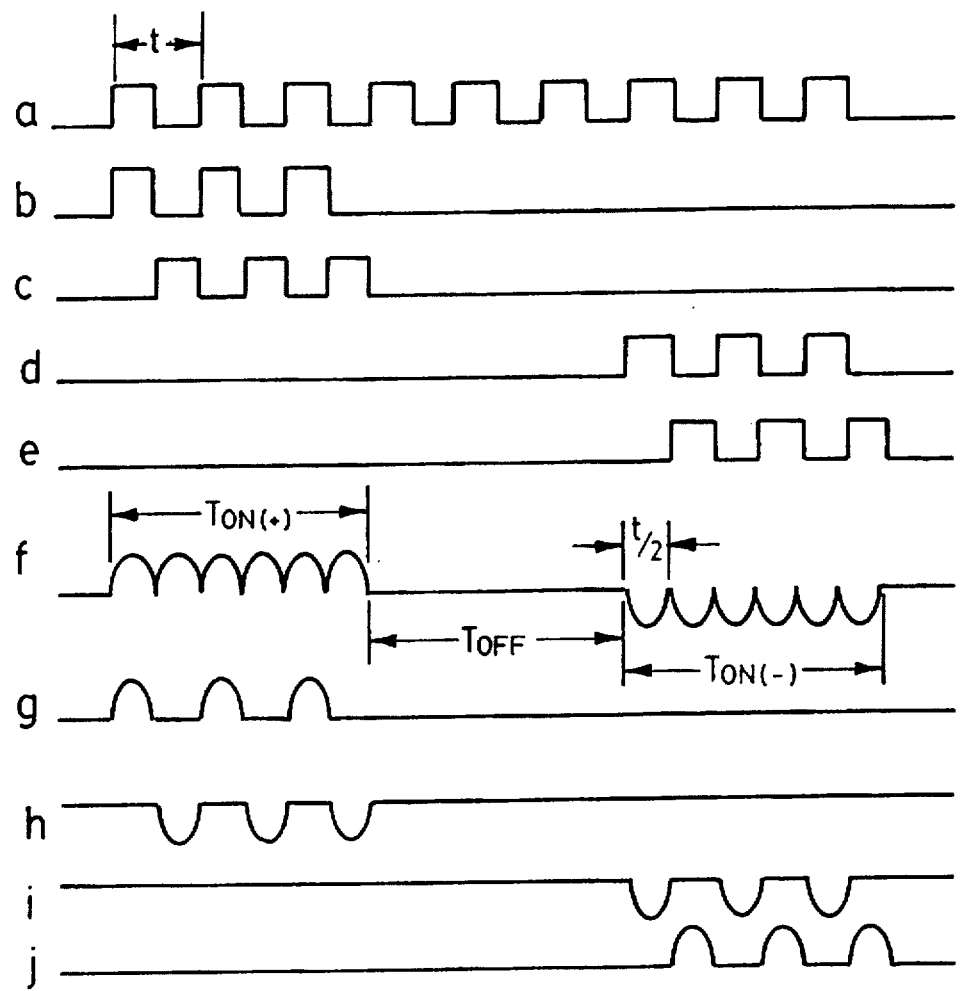

FIGS. 4a, 4b and 4c and 5a, 5b and 5c compare ideal and actual waveforms occurring in TDEM operations;

FIG. 6 illustrates a prior art modified TDEM transmitter waveform;

FIG. 7 illustrates a modified transmitter waveform utilized in a TDEM operation in accordance with the invention;

FIG. 8 is a graphical comparison of the relative initial amplitude of the response to the waveforms of FIG. 5 line (a), and FIG. 7;

FIG. 9 is a schematic diagram of a first embodiment of TDEM output stage designed to implement the invention, and FIGS. 9a, 9b, 9c, 9d, 9e, 9f, 9g, 9h, 9i and 9j represents waveforms present at various points in the circuit;

FIG. 10 is a schematic diagram of a second embodiment of TDEM output stage designed to implement the invention.

and FIGS. 10a, 10b, 10c, 10d, 10e, 10f, 10g & 10h represent waveforms present at various points in the circuit;

FIG. 11 is a schematic diagram of an exemplary circuit producing waveforms suitable for driving the output stages of FIGS. 9 and 10, and FIGS. 11a, 11b, 11c, 11d, 11e, 11f, 11g, 11h, 11i, 11j and 11k represent waveforms present at various points in the circuit.

DESCRIPTION OF THE PREFERRED EMBODIMENTS

Figure 1A:
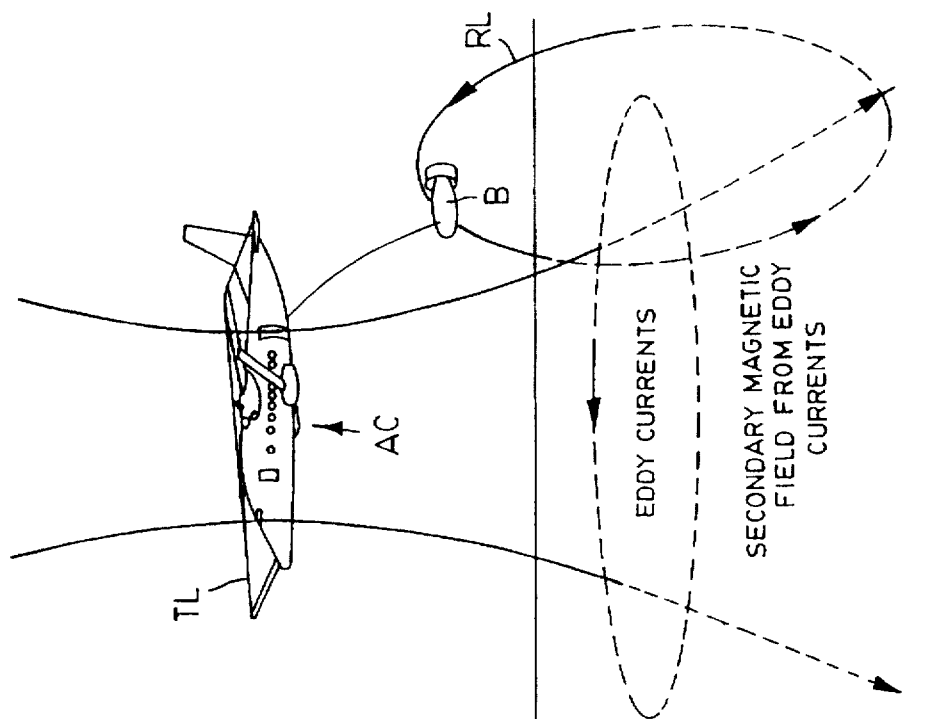
FIG. 1A is a diagram schematically illustrating typical TDEM operations.
Figure 1A:
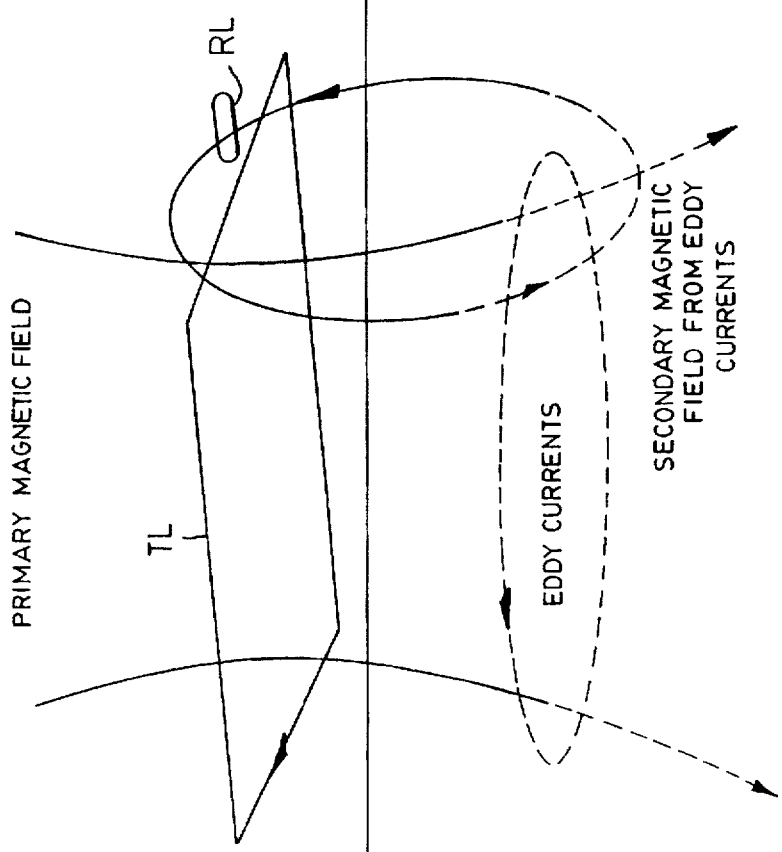
Figure 1B:
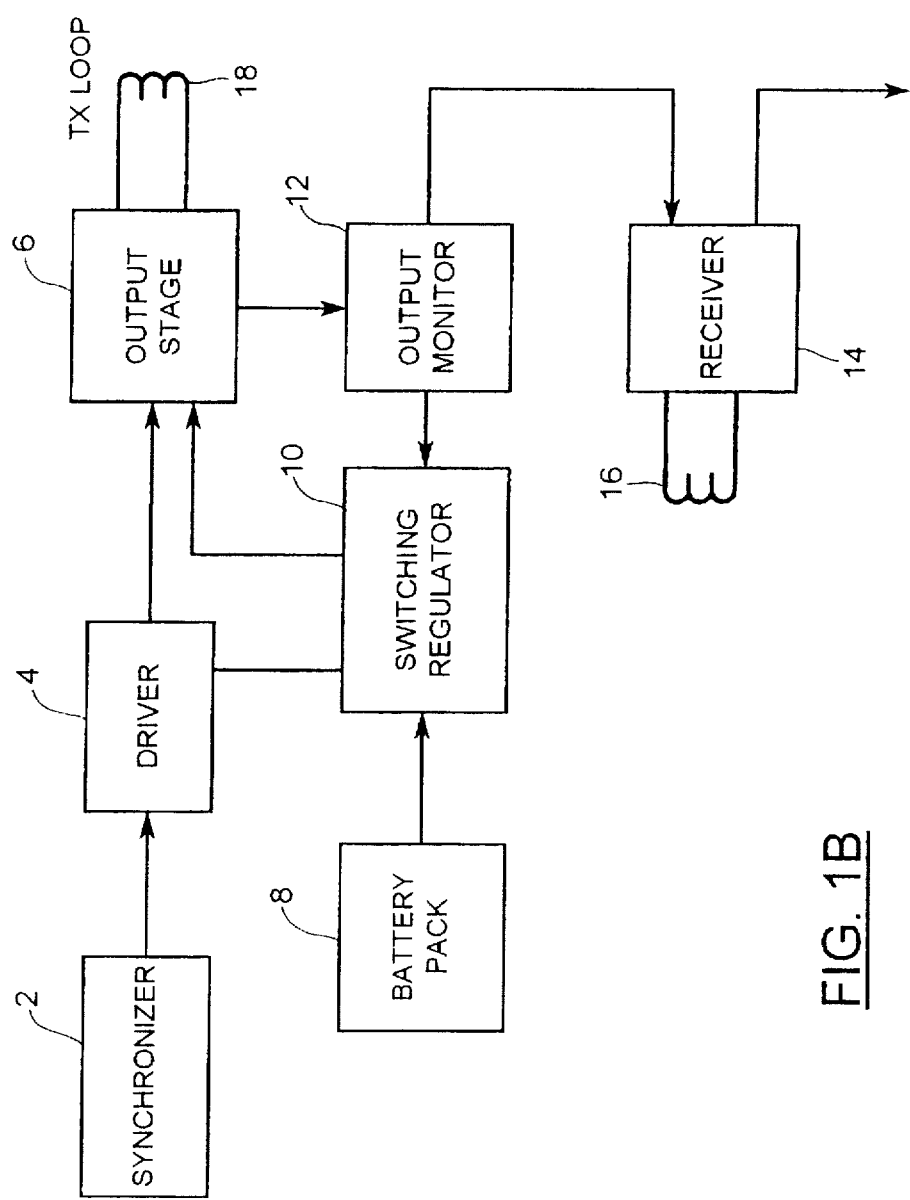
FIG. 1B is a block diagram of typical TDEM apparatus.
Figure 2:
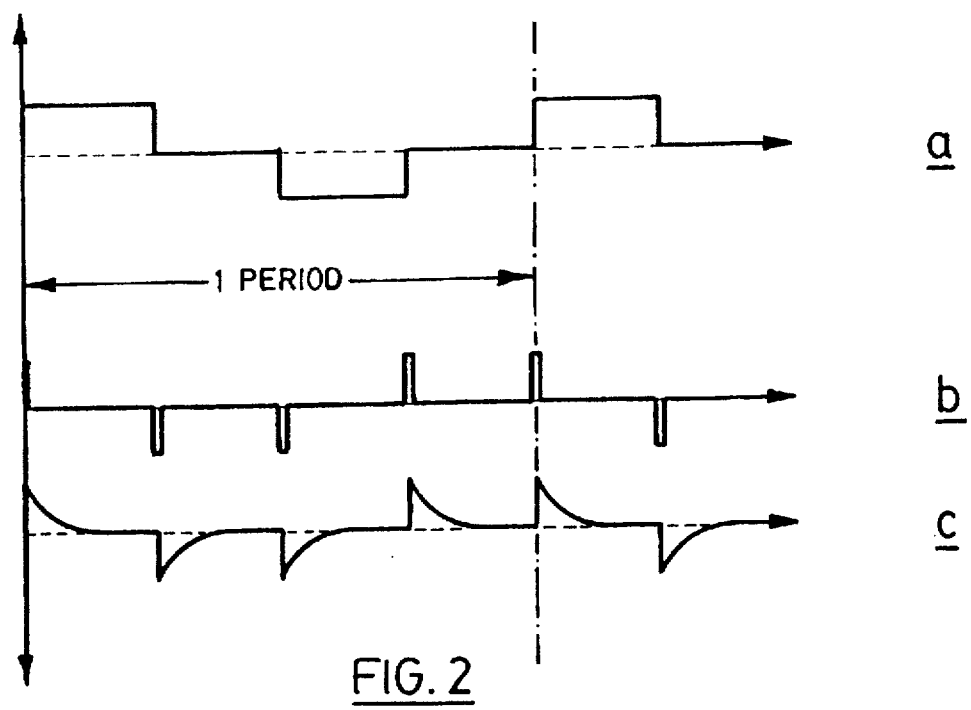
FIGS. 2a, 2b and 2c illustrates the waveforms utilized in a classical TDEM operation.

The invention may be implemented by modification of a typical TDEM apparatus such as is shown in FIG. 1B. This consists of a transmitter comprising blocks 2,4,6,8,10 and 12, and a receiver comprising block 14. The construction and operation of the receiver 14 and its associated receiver coil 16 may be in accordance with conventional TDEM practice and form no part of the present invention.

In the transmitter, only the synchronizer 2, driver 4 and output stage 6 need be modified, although the transmitter coil 18 will need to be of a design suited to the output stage design, as described further below.

As shown, the transmitter includes a battery pack 8 or alternative power source, a regulator circuit 10 used to drive an output stage 6 and to maintain a constant amplitude of pulses output by the output stage. An output monitor 12 monitors the output of the output stage to provide feedback control of the regulator 10 and a reference signal to the receiver 14. A synchronizer 2 generates clock and control signals for the driver stage 4, and other functions of the transmitter. The clock signal may be synchronized to a local power distribution frequency to help eliminate beat interference from that source in the receiver output.

It is a central feature of the invention that the current waveform in the transmitter coil 18, for each pulse P, be a series of half sinusoids S of common polarity and duration Tc as shown in FIG. 7, rather than each pulse being a single half sinusoid as shown in FIG. 6. As will be apparent from FIG. 7, the inclusion of a number of half sinusoidal pulses S, derived from a sinusoidal waveform of relatively high frequency, in each pulse P rather than a single half sinusoid, derived from the sinusoidal waveform of relatively much lower frequency, in each alternate period of the waveform (assuming the total period of the waveforms of FIGS. 6 and 7 to be the same), means that the rate of change of the transmitter current and primary field at the end of each pulse will be greater by a factor equal to the number of half sinusoids in the pulse S of FIG. 7. Indeed, by making the factor large enough, close approximation to the performance of a square ware pulse may be achieved while maintaining the advantages of utilizing a resonant transmitter.

In order to achieve the same response from a target of given time-constant, when excited by the waveform of line (a) of FIG. 5 with a ramp duration of To, the waveform of FIG. 7 must have a duration Tc approximately equal to To/6. This relationship was derived from an examination of FIG. 8, which plots the relative initial amplitude response for the waveform of FIG. 5, line (a) (broken line) and FIG. 7 (full line) against To/T or $T_c/T$. First the amplitude of the full-line curve was normalized to read unity for low values of $T_c/T$ by dividing all values of the ordinate by 0.63 (see below). Secondly, the point on both curves at which the amplitude was 0.707 times the maximum amplitude was marked. Thirdly, the full-line curve was translated horizontally along the abscissa until the marked points on both curves coincided, whereupon the corresponding values of the two abscissa were noted. It was observed that coincidence corresponded to the values $T_o=6\times T_c$. For the plots of FIG. 8 the full-line curve has been translated by this amount. Of course this relationship defines a value for $T_c$ which will provide the same response; reducing $T_c$ still further will further improve the relative excitation of short time-constant targets, while a smaller reduction may still prove advantageous. Factors of 4, 6 and 8 are exemplified in the present disclosure. In practice, resonant frequencies which will provide these factors are easily achieved with the type of transmitter loops or coils used in conventional TDEM systems, while the use of smaller or higher factors is not excluded.

Figure 3:
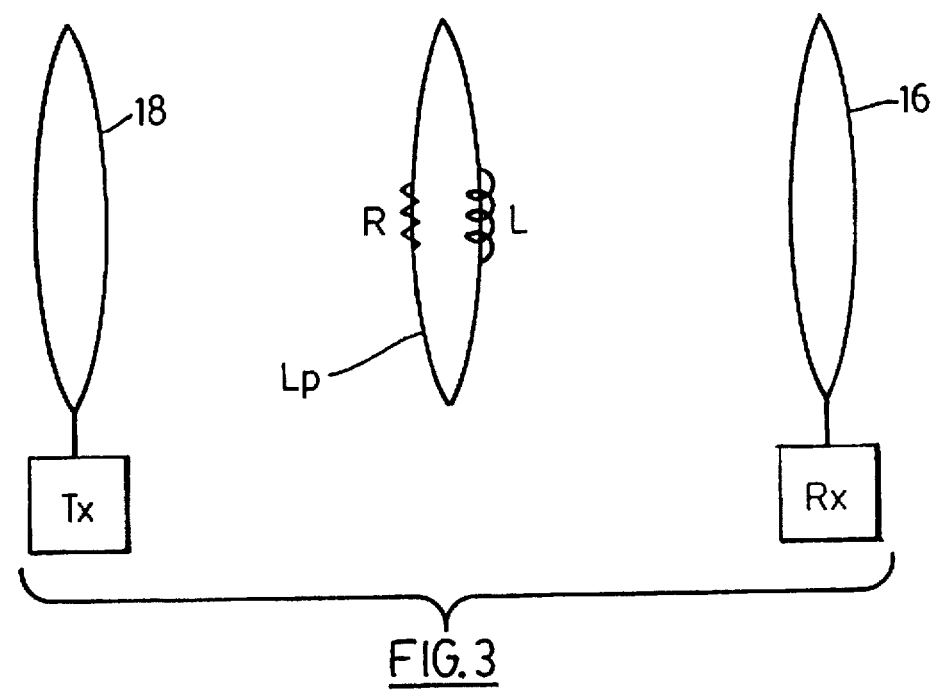
FIG. 3 illustrates a theoretical target useful for examining TDEM operations.
Figure 4:
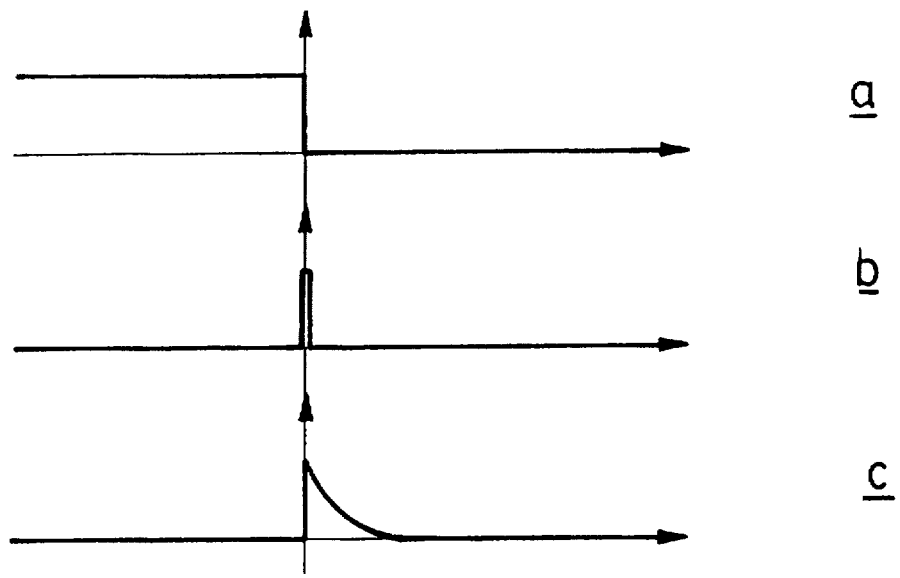

It should be noted that, as indicated in FIG. 8, for equal amplitudes for Io in the waveforms of FIG. 5, line (a) and FIG. 7, the amplitude of the response from the simple loop target of FIG. 3 for the waveform of FIG. 7 will only be 0.63 times the amplitude for the waveform of FIG. 5, line (a) regardless of the value of the time constant. Apart from this caveat, the similarity of shape between the two curves of FIG. 8 is notable, given the quite different nature of the two transmitter waveforms. This implies that, for targets other than the simple loop target of FIG. 3, the relationship given in (1) above will still be approximately true, and furthermore the waveform of FIG. 7 will generally be a satisfactory current waveform in TDEM transmitters designed for any application.

In the initial stages of the design of a transmitter using the waveform of FIG. 7, the minimum value of target time-constant to be easily detected should be decided, and the graph of FIG. 8 may then be used to determine an appropriate value of Tc. The equation $$f=1/(2\times Tc)$$

can then be used to calculate the resonant frequency of the loop.

FIG. 9 shows one embodiment of transmitter output stage, and associated waveforms of signals at various points in the circuit, using a transmitter coil 18 in the form of two section null coupled transmitter loop $L_1$, and $L_2$. Output driver generator $V_s$ supplies high frequency signal, (waveform of FIG. 9a) via an output matching transformer TF to the output stage. Thyristor switches D1 and D2, controlled by signals as shown in FIGS. 9b and 9c conduct alternatively to pass currents through output loop sections $L_1$ and $L_2$. Loop sections $L_1$ and $L_2$ are magnetically null coupled so that there is no interaction between them, and connected in opposition so that the resulting magnetic field shown in FIG. 9f during each generated pulse is in the same direction.

Current in each loop section during a pulse is shown in waveforms of FIGS. 9g and 9h. During Toff periods all switches are disabled.

Following an off period thyristor switches $D_3$ and $D_4$ are activated by control signals (FIGS. 9d and 9e) to conduct the currents shown in waveforms (FIGS. 9i and 9j) through the loop sections to produce a primary field (FIG. 9f) in the opposite direction from that during the preceding pulse.

For the proper working of the circuit it is necessary to satisfy the following conditions:

$$Ton = \frac{nt}{2} \quad n=1,2\ldots p$$
$$Toff = kt \quad k=1,2\ldots v$$

where

Ton is period that output current is on

Toff is period that output current is off t is a period of the high frequency signal from the driver circuit n and k are numbers from 1 to infinity Capacity C is used to tune out the inductance of the output loops.

FIG. 10 shows a modified output stage for use with a transmitter coil 18 formed by a single section transmitter loop L and a output bridge circuit for controlling the flow of output current.

In this configuration the output loop L is driven alternately by a high frequency signal (FIG. 9a) through the switches $D_1$ and $D_2$ controlled by the signal of FIG. 9c, during the first half of high frequency period, and through switches $D_3$ and $D_4$, controlled by the signal of FIG. 9d for the second half period of the high frequency signal $V_s$ (FIG. 9a). This produces unipolar signal $I_L$ (FIG. 9b) during a positive pulse period through the output loop L. During an off period between pulses all switches are disabled.

During a negative pulse period switches $D_5$ and $D_6$ are controlled by the signal of FIG. 9e for a first half of each high frequency FIG. (9a) period, and switches $D_7$ and $D_8$ are controlled by the signal of FIG. 9f for a second half of each high frequency period, to produce unipolar current in the output loop L in the opposite direction from the direction during the positive pulse period. Capacitor C is used to tune out the inductance of the output loop. The waveforms of FIGS. 9g and 9h show voltage waveforms across output loop L and tuning capacitor C.

FIG. 11 shows schematically a exemplary driver circuit 4 that may be used to generate necessary signals to drive the output stages shown in FIGS. 9 and 10.

The circuit receives the high frequency signal (FIG. 11a), which is the same in each of FIGS. 9a, 10a and 11a, with a period which is double Tc, from the synchroniser 2, and applies it to a counter C1 and to inputs of AND gates G4 and G6, to inputs of AND gates G5 and G7 via an inverter A1. Outputs Q1 and Q4 of the counter C1 (see waveforms of FIGS. 11c and 11d, which is a four stage binary resettable counter, are applied to gates G1 and G2 to generate a signal (waveform of FIG. 11b) applied to a reset input of the counter to reset it at each count of nine. This renders the waveform at output Q3 (waveform of FIG. 11e) slightly asymmetrical, on for four periods and off for five. A divide by two counter C2 receives the output Q3 and provides a symmetrical waveform (waveform of FIG. 11f) of one eighteenth the frequency of the high frequency signal. In the example shown in FIG. 11, this will provide pulse lengths equal to eight times Tc. Pulse lengths of six times Tc (as in FIG. 9f) or four times Tc (as in FIG. 10b) can be achieved by changing the counter output decoding to provide resets at counts of seven or five respectively.

The waveform at the output of counter C2 is applied to inputs of gates G4 and G5 (waveform of FIG. 11f) and via an inverter A3 to inputs of gates G6 and G7 (waveform of FIG. 11g), while the waveform of FIG. 11e is applied to inputs of all four gates G4, G5, G6 and G7, providing the waveforms, of FIGS. 11h, 11i, 11j and 11k respectively, corresponding to the waveforms of FIGS. 9b, 9c, 9d and 9e and waveforms of FIGS. 10e, 10f, 10g and 10h.

It should be understood that the circuits of FIGS. 9–11 are presently preferred examples of circuits providing a desired primary magnetic field from the coil 18, and that functionally equivalent transmitter circuits may be substituted within the scope of the invention. The thyristors used in the exemplary circuits may be replaced by other gate controlled switching devices suited to the circuit employed, or the desired waveforms may be synthesized by other techniques capable of providing an appropriate current drive to the coil 18.

We claim:

1. In a time-domain electromagnetic (TDEM) instrument having a transmitter, the transmitter generating intermittent current pulse waveforms, formed by half-sinusoidal output waveform segments of a waveform having a frequency equal to a resonant frequency of the transmitter coil when connected to the transmitter, and including a transmitter coil, and a receiver including a receiver coil, the improvement wherein the transmitter generates current pulses which each comprise a plurality of immediately successive half-sinusoidal waveforms of common polarity.

2. An instrument according to claim 1, wherein the transmitter includes an output stage comprising a resonant circuit incorporating said transmitter coil, a power supply providing current at an input frequency corresponding to the resonant frequency of said transmitter coil, electronically controlled switching devices, and a driver circuit for said switching devices permitting current to flow in the transmitter coil at times and in directions corresponding to a desired current pulse waveform.

3. An instrument according to claim 2, wherein the transmitter coil comprises a two section null-coupled winding.

4. A method of performing time domain electromagnetic mapping comprising intermittently energizing a transmitter coil with current pulse waveforms formed by half-sinusoidal waveform segments of a sinusoidal waveform having a frequency corresponding to a resonant frequency of the coil, and examining currents induced in a receiver coil following termination of said current pulse waveforms, the improvement in which each current pulse waveform is formed by plural immediately successive half-sinusoidal waveforms of common polarity.

* * * * *